No. 753,699. PATENTED MAR. 1, 1904.
J. & M. HADALLER.
MILK COOLER.
APPLICATION FILED MAY 12, 1903.
NO MODEL. 2 SHEETS—SHEET 1.

Witnesses
Inventor
Jos. Hadaller.
Mary Hadaller.
By
Attorneys

No. 753,699. PATENTED MAR. 1, 1904.
J. & M. HADALLER.
MILK COOLER.
APPLICATION FILED MAY 12, 1903.
NO MODEL. 2 SHEETS—SHEET 2.

Witnesses
Inventors
Jos. Hadaller
Mary Hadaller
By
Attorneys

No. 753,699. Patented March 1, 1904.

UNITED STATES PATENT OFFICE.

JOSEPH HADALLER AND MARIA HADALLER, OF EFFINGHAM, ILLINOIS.

MILK-COOLER.

SPECIFICATION forming part of Letters Patent No. 753,699, dated March 1, 1904.

Application filed May 12, 1903. Serial No. 156,733. (No model.)

*To all whom it may concern:*

Be it known that we, JOSEPH HADALLER and MARIA HADALLER, citizens of the United States, residing at Effingham, in the county of Effingham, State of Illinois, have invented certain new and useful Improvements in Milk-Coolers; and we do hereby declare the following to be a full, clear, and exact description of the invention, such as will enable others skilled in the art to which it appertains to make and use the same.

This invention relates to milk-coolers; and it has for its object to provide a machine which will cool the milk to a maximum degree in a minimum of time and in which, furthermore, the milk will be subjected to the direct action of air and the vapors that arise from the milk will be driven off.

Other objects and advantages of the invention will be understood from the following description.

Figure 1:
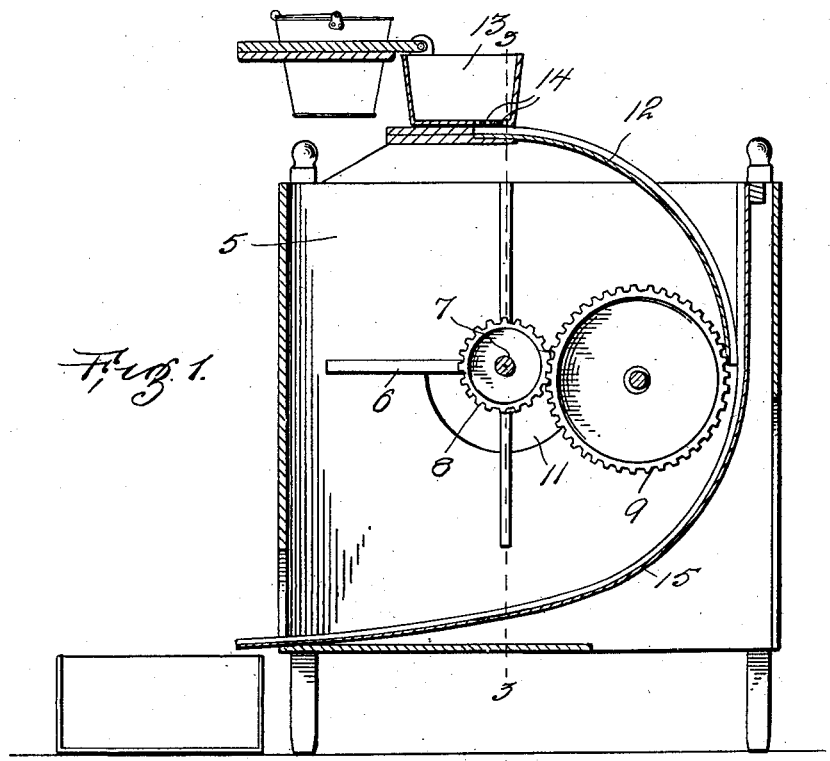
Figure 2:
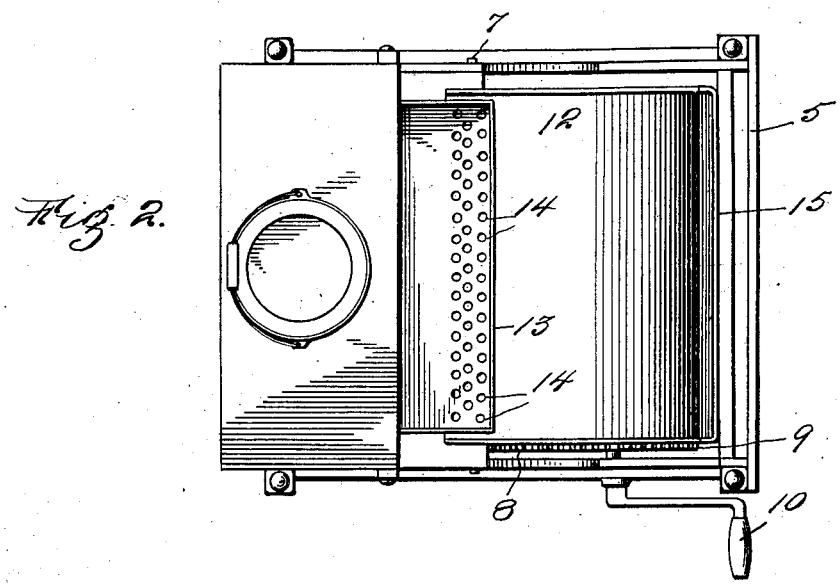
Figure 3:
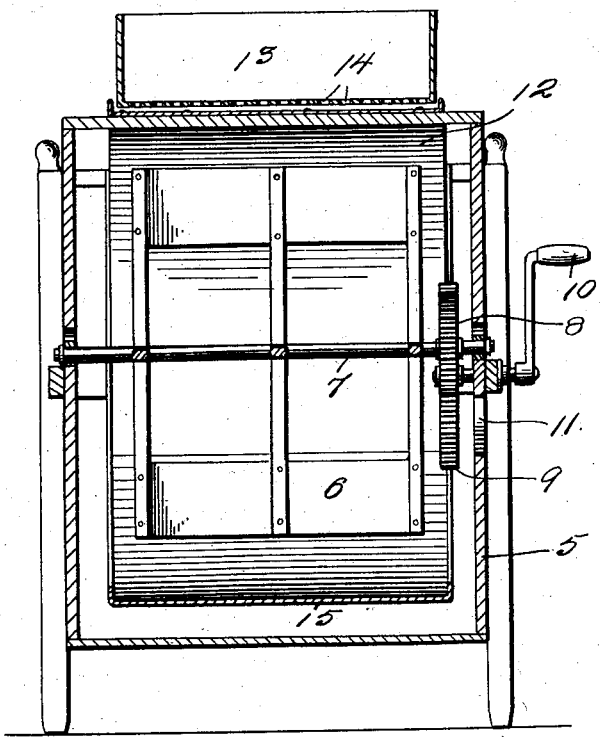
Figure 4:
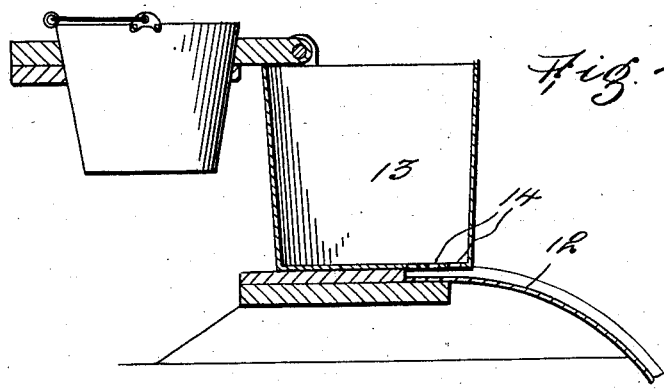

In the drawings forming a portion of this specification, and in which like numerals of reference indicate similar parts in the several views, Figure 1 is a vertical section through a milk-cooler embodying the present invention. Fig. 2 is a top plan view of the milk-cooler. Fig. 3 is a vertical section on line 3 3 of Fig. 1. Fig. 4 is a vertical section through the hopper.

Referring now to the drawings, the present milk-cooler comprises a casing 5, which may be rectangular in form and in which is mounted a rotary fan 6 on a shaft 7, said shaft being provided with a pinion 8, that engages a gear-wheel 9, provided with a handle 10 for rotating it, the gear and pinion being arranged interior to the casing.

Through the side of the casing adjacent to the shaft 7 is an air-intake 11, through which may pass air to the fan, the air being discharged from the fan at the periphery thereof.

Above the fan is an arc-shaped plate 12, which extends concentrically with the fan-wheel from one side of the center of the wheel around the wheel and downwardly into the casing to a point at the same height with the shaft 7, the side edges of the plate 12 being slightly raised to form a trough. Supported at the upper end of the plate or trough 12 is a hopper 13, which is spaced slightly above the bottom of the trough and has perforations 14 in its lower end, so that the milk that is poured into the hopper may pass through the perforations and into the trough, through which it will run and from the lower end of which it will be discharged.

A second arc-shaped trough 15 is disposed within the casing 5, with its upper end at the top of the casing and at the outer or convex side of the trough 12, the trough 15 extending downwardly in spaced relation to the trough 12 and then transversely beneath and beyond the fan-wheel, the end of the trough projecting through the side of the casing. With this position of trough 15 it will be seen that it will receive from the trough 12 and convey the milk around beneath the fan-wheel and finally discharging it to a bucket or other receptacle 16.

It will be noted that the milk runs on the convex side of the trough 12 and on the concave side of the trough 15 and that when the fan is rotated the air will be forced over the surface of the milk in the trough 15 and then upwardly against the bottom of the trough 12 and will finally be discharged between the upper end of the trough 12 and the side of the casing, it being noted that the wall of the casing is extended upwardly to touch that portion of the trough 12 which extends above the main body portion of the casing.

With the present construction it is found that the milk is freshened and by reason of passing in a thin or shallow stream through the troughs is quickly reduced in temperature to the desired degree.

In practice modifications of the specific construction shown may be made and any suitable materials and proportions may be used for the various parts without departing from the spirit of the invention.

What is claimed is—

1. A milk-cooler comprising a fan, a trough partly encircling the fan and disposed to carry milk exposed to air-currents from the fan, a second trough disposed above the fan and arranged to discharge into the first-mentioned trough, and a hopper having discharge-openings leading to the second trough.

2. A milk-cooler comprising a casing, a rotary fan mounted in the casing and adapted to discharge air at its periphery, an arc-shaped trough, disposed within the casing, extending from its top and passing around beneath the fan, a second arc-shaped trough, inverted in respect to the first-named trough, disposed within the casing, extending from a point below the top of the first-named trough, and spaced therewith, and passing around above the fan, and a hopper supported above the second arc-shaped trough.

3. A milk-cooler comprising a casing, a rotary fan mounted in the casing and adapted to discharge air at its periphery, an arc-shaped trough in the casing passing around beneath the fan, a second arc-shaped trough passing around above the fan and disposed to discharge to the first-named trough, and a hopper disposed to discharge into the second trough, the first trough being arranged to receive air-currents against its contents and the second trough being arranged to receive air-currents against its under side.

In testimony whereof we affix our signatures in presence of two witnesses.

JOSEPH HADALLER.
MARIA HADALLER.

Witnesses:
B. F. KAGAY, Jr.,
BESSIE H. KAGAY.